United States Patent

Graff

[15] 3,649,071
[45] Mar. 14, 1972

[54] METHOD AND APPARATUS FOR CUTTING CURBSTONES AND THE LIKE

[72] Inventor: Donald E. Graff, 122 Fenmar Drive, Weston, Ontario, Canada

[22] Filed: Mar. 13, 1970

[21] Appl. No.: 19,234

[52] U.S. Cl. .................................. 299/41, 94/22, 299/15, 299/75
[51] Int. Cl. ........................................... E01c 23/09
[58] Field of Search ........................... 299/15, 39, 41, 75

[56] References Cited

UNITED STATES PATENTS

| | | | |
|---|---|---|---|
| 1,565,444 | 12/1925 | Hashim | 299/39 |
| 3,148,001 | 9/1964 | Johnson | 299/75 |
| 3,269,775 | 8/1966 | Hatcher | 299/39 |
| 2,857,147 | 10/1958 | Lewis | 299/39 |

*Primary Examiner*—Ernest R. Purser
*Attorney*—Fetherstonhaugh & Co.

[57] ABSTRACT

A method and apparatus for cutting curbstones and the like, the apparatus comprising a frame mounted on wheels to be movable and having support jacks for supporting the frame in a fixed position when the wheels are elevated, the frame having a guide track and drive system supporting a rotary cutter blade. The rotary cutter blade is mounted on a shaft to rotate in a horizontal plane and the shaft is pivotable to move the cutter blade from the horizontal plane to an obliquely disposed plane. The cutter blade drive mechanism is movable on the frame in a controlled path for movement longitudinally of the frame and movement transversely of the frame. In the method of forming a drive-in ramp, the frame is moved to an operative position relative to the curbstone and secured in the required position by the jacking devices. The cutter blade is rotatably driven and moved tranversely of the frame to form a substantially horizontal transverse cut into the width of the curbstone and then the blade is driven longitudinally of the frame to form a longitudinally extending cut in the curbstone. Obliquely disposed end cuts are formed by disposing the cutter blade in the oblique position and guiding the blade transversely of the frame.

6 Claims, 5 Drawing Figures

Patented March 14, 1972
3,649,071
2 Sheets-Sheet 1
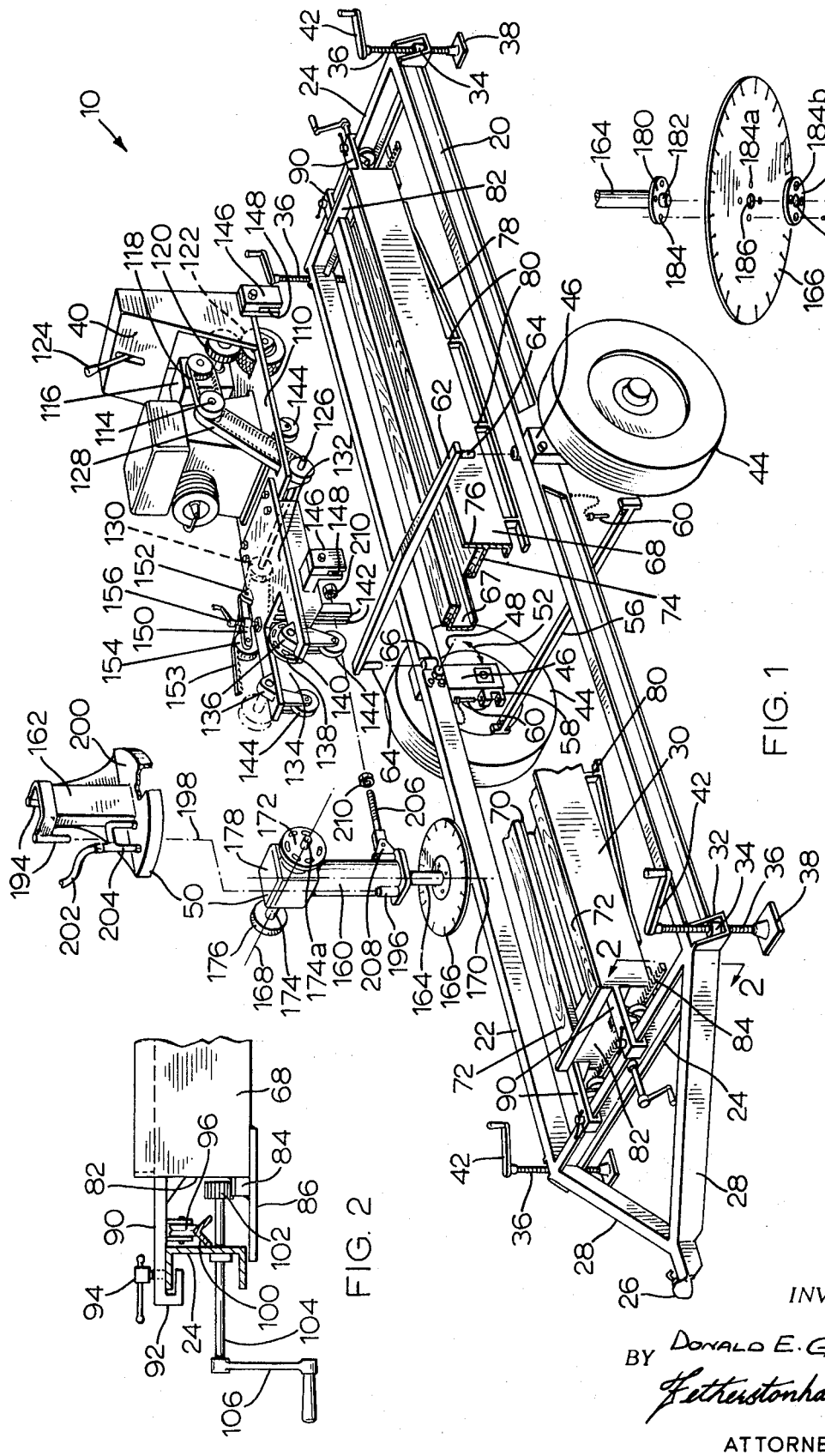
INVENTOR.
BY Donald E. Graff
Fetherstonhaugh & Co.
ATTORNEYS Patented March 14, 1972

INVENTOR.
BY DONALD E. GRAFF.
Fetherstonhaugh & Co.
ATTORNEYS

METHOD AND APPARATUS FOR CUTTING CURBSTONES AND THE LIKE

1. Field of Invention

This invention relates to a method and apparatus for cutting curbstones and the like.

In particular, this invention relates to an in situ method and apparatus for cutting curbstones and the like to provide drive-in ramps without destroying the previously laid curbstones.

2. Prior Art

Curbstones usually project some 6 to 8 inches above the level of the road surface and extend downwardly up to 20 inches below the level of the road surface. Quite, frequently, it is necessary to provide a drive-in access ramp in a curb which was constructed before the need for such a ramp was appreciated. This occurs in both new construction sites and in redevelopment sites. The drive-in access lowers the level of the upper surface of the curbstone to approximately the same level as the road surface so that it is possible to drive a motor vehicle across the curbstone without difficulty.

The present method of forming a drive-in ramp in a curbstone after the conventional curbstone has been laid down is to remove the curbstone by means of air hammers and the like and to form a new curbstone in its place having an access ramp therein. This process requires the operator to completely destroy the existing curbstone, to form a molding box around the area of the destroyed curbstone, to pour concrete into the molding box and then to form the upper end thereof to provide the drive-in ramp and, after setting, fill in the portion of the roadway or pavement on either side of the newly laid curbstone. This method is an extremely inefficient method of operation requiring air hammers which, in themselves, are inefficient and unpleasant to work with. In addition, the air hammers require a compressor unit for providing the compressed air to be located at the work site. A considerable period of time is required to remove the curbstone by breaking it up with an air hammer. In addition, considerable time and skill is required in setting up the molding box, pouring the concrete to form the new curbstone and allowing it to set. All of these time-consuming operations require considerable man hours with the result that the labor costs are substantial. In addition, the efficiency of the operation is reduced, due to the fact that the original curbstone must be completely destroyed with the result that the material costs involved are substantial. The pouring of a new curbstone requires that the concrete either by mixed at the site or supplied in a ready-mix form which again is a costly service.

While a number of devices have been developed for cutting into the paved surface of a roadway to outline the area of the roadway to be broken up by an air hammer, none of these devices are capable of removing a portion of a curbstone. One of these known cutting devices employs a cutter which is disposed in a vertical plane so as to form a cut which extends downwardly into the paved surface of a road.

SUMMARY

The present invention overcomes the disadvantages of the prior art described above by providing a method and apparatus which considerably reduces the man hours and material costs and, therefore, the overall cost of cutting curbstones and the like to form drive-in ramps.

According to an embodiment of the present invention, the apparatus consists of a device for cutting curbstones and the like which comprises a support frame having a rotary cutter blade mounted thereon for rotation in a substantially horizontal plane so that it may cut horizontally into a curbstone. The device also has drive means for rotatably driving the cutter blade and guide means for guiding the cutter blade in a transverse direction and in a longitudinal direction relative to the frame to cause the rotary cutter blade to cut through the curbstone by movement in a controlled path.

The method of the present invention enables a drive-in ramp to be formed in a curbstone without completely destroying the curbstone.

A method according to the present invention comprises the steps of driving a horizontally disposed rotary cutter blade in a suitable manner so as to form a longitudinal cut through the thickness of the curbstone so that a portion of the curbstone may be cut away without destroying the remainder of the curbstone.

The invention will be more clearly understood after reference to the following detailed specification read in conjunction with the drawings, wherein:

FIG. 1 is an exploded detailed view of a curbstone cutting device according to an embodiment of the present invention;

FIG. 2 is an enlarged cross-sectional view of a portion of the device taken along the line 2—2 of FIG. 1;

FIG. 3 is a detailed view of a cutter blade and the manner in which it is mounted on the drive shaft;

Figure 4:
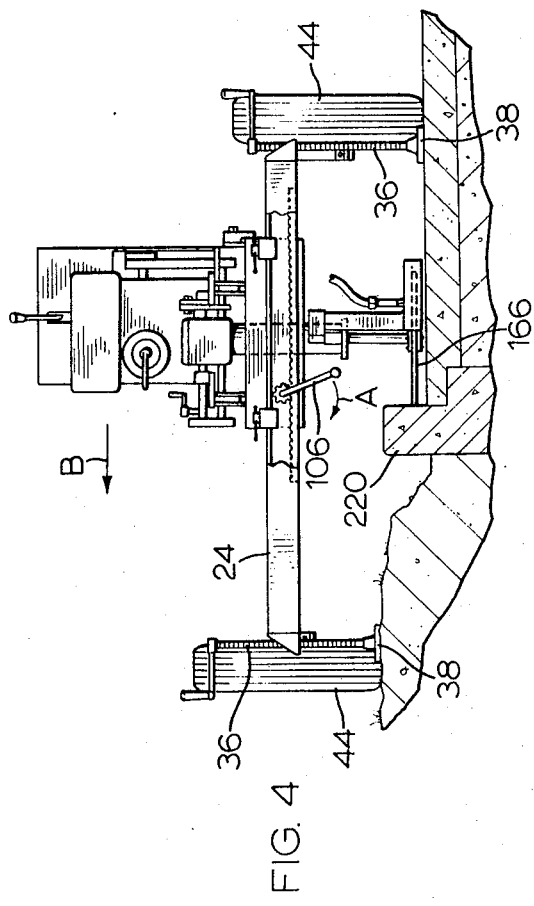
FIG. 4 is an end view of the apparatus disposed in an operational position.

With reference to FIG. 1 of the drawings, the reference numeral 10 refers generally to an apparatus for cutting curbstones and the like according to an embodiment of this invention. The apparatus consists of a frame generally identified by the reference numeral 20, a longitudinal guide track 30, a movable carriage 40, and a cutter assembly 50.

The frame 20 is designed to enable the apparatus to be moved from one location to another and to be stably mounted in a predetermined operative relationship with respect to a curbstone when the apparatus is in use. The frame 20 consists of a substantially rectangular main frame formed from longitudinally extending U-shaped channel members 22 and transversely extending U-shaped channel members 24. A conventional trailer hitch 26 is mounted at one end of the frame by means of obliquely disposed channel members 28. At each of the four corners of the rectangular frame 22, a U-shaped channel member 32 serves to support a threaded boss 34 which is adapted to receive a complementary jack-screw 36. Support pads or feet 38 are mounted on the lower end of the jacking screws 36 and a manually engageable handle 42 is mounted at the upper end. By adjustment of the jacking screw 36, it is possible to line up the frame as indicated, for example, in FIG. 4 of the drawings. A pair of wheels 44 are mounted substantially centrally of the frame. Wheel supports 46 are pivotally mounted on the frame members 22 for pivoting movement about the axis 48 in the direction of the arrows 52. When the wheels are in their downwardly pivoted position, as shown in FIG. 1, they are rigidly retained in this position by means of anchor pins 54 which pass through the frame members 22 and threadably engage the wheel supports 46. When the wheels are to be released and allowed to pivot, the anchor pins 54 are removed. To add rigidity to the frame structure during transportation, a tie bar 56 is located within U-shaped blocks 58 which are secured to each of the wheel supports 46. The U-shaped blocks 58 and the tie bar are formed with an opening which is adapted to receive the locking pins 60 which pass through the blocks 58 and the tie bar 56. The locking pins 60 are secured to the frame members 22 by a suitable chain so that they do not become misplaced when the tie bar is not in use. The frame is further strengthened by a removable tie bar 62 which has downwardly extending pins 64 adapted to fit within sleeves 66 which are secured to the frame members 22. This tie bar is again used when the apparatus is being transported, at which time the tie bar 62 extends below the carriage 50.

The longitudinal guide rail assembly 30 consists of a first longitudinally extending guide rail 67 and a second longitudinally extending guide rail 68. The first longitudinally extending guide rail 67 is in the form of a U-shaped channel member having an upper flange 70 which supports a replaceable track member 72 which may be in the form of a wooden runner or a plastic runner or the like. The guide rail 68 is a U-shaped portion at its lower end having an upper flange 74 extending parallel to the flange 70 of the guide rail 67. Again, a suitable runner material 72 is mounted on the flange 74. The guide rail 68 also has a vertically extending flange portion 76 which extends upwardly beyond the upper edge of the runner surface 72 to guide the movement of the carriage 40, as will be described hereinafter. The support rail 68 is further reinforced by a support bar 78 which is connected at either end to the guide rail 68 and spaced outwardly therefrom over the remainder of its length by means of support columns 80 which are arranged at longitudinally spaced intervals. The guide rails 67 and 68 are connected at each end by end plates 82. The rack 84 is rigidly secured to the base plate 86 which is secured to the rails 67 and 68. As shown in FIGS. 1 and 2 of the drawings, a pair of support bars 90 extend outwardly from each end of the guide rail assembly 30 and have a U-shaped outer end portion 92 which fits over the upper flange of the transversely extending frame members 24. A clamping screw 94 is threadably located within each of the bars 90 and adapted to be releasably wound into position to clamp the upper flange of the transverse frame member 24 within the U-shaped end 92 so as to rigidly secure the guide rail assembly 30 against movement relative to the frame.

It is also important to provide for controlled movement of the assembly 30 relative to the frame and, to achieve this, a roller 96 is rotatably mounted on each support bar 90. The roller 96 has a V-shaped bearing surface which is adapted to ride along a V-shaped rail 100 which is rigidly secured to each of the transversely extending frame members 24. To achieve controlled transverse movement of the assembly 30 relative to the frame, there is provided transverse drive means which includes a rack 84 which, as previously mentioned, is secured to the carriage and a pinion 102 which is mounted on shaft 104 which is journaled in shaft 126 by means of a belt drive 128. A pulley 130 is mounted at the other end of shaft 126. The pulley 130 is connected to the cutter assembly as will be described hereinafter.

A platform 132 is secured to the front end of the base plate 110 by four setscrews. The platform 132 extends forwardly and has a rectangular opening 134 at the forward end thereof. A pair of bearings 136 are mounted on opposite sides of the opening 134 in axial alignment with one another. A semicircular plate 138 is mounted in axial alignment with one of the bearings 136. The semicircular plate 138 has a plurality of circumferentially extending elongated slots 140 formed therein to permit angular adjustment of the cutter assembly, as will be described below. A pair of lugs 142 extend downwardly from the undersurface of the platform 132 centrally of the width thereof in a spaced parallel relationship to receive an anchor bolt which is secured to the out assembly, as will be described below. The carriage 40 is supported on the original guide rails 67 and 68 by four wheels 144 which are mounted on support brackets which extend downwardly from the underside of the platform 132 and the base plate 110. As previously indicated, the drive wheel 122 also rides on the guide rail 74 and serves to provide additional support for the carriage. The carriage 40 is guided in a straight line path along a longitudinal guide rail assembly by means of a pair of guide brackets 146 which are mounted at opposite ends of the carriage and are formed with a slot 148 which is adapted to receive the outwardly projecting flange portion 76 of the guide rail 68 in a sliding relationship, A drive belt tensioning device 150 is pivotally mounted at one end in a bearing 152 which is secured to the upper surface of the platform 132 and a pulley 154 is rotatably mounted at the other end thereof. The pulley is adjustable with respect to the frame by means of a jacking screw 156 which threadably engages the lever 152 between the ends thereof.

Figure 5:
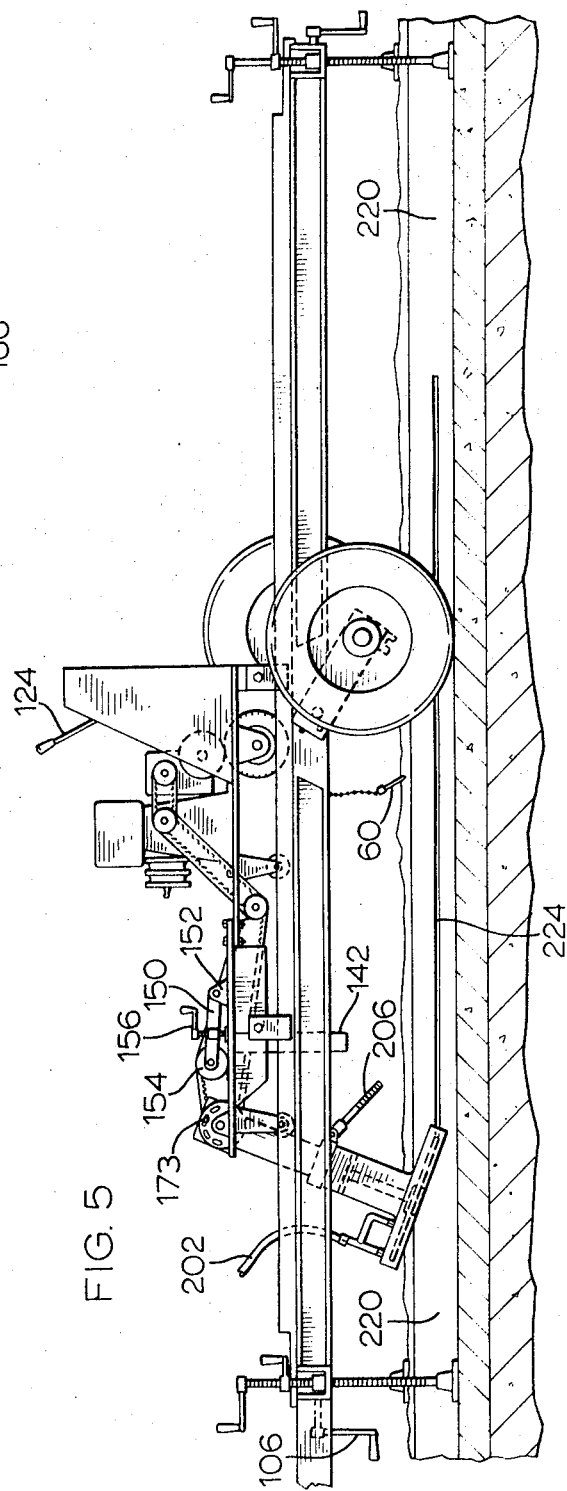
FIG. 5 is a side view of the apparatus of FIG. 4 showing a further step in the operation.

The cutter assembly consists of a housing 160, a cutter guard 162, a drive shaft 164, and a cutter blade 166. The housing 160 has a transversely extending axis 168 and a vertically extending axis 170. A mounting plate 172 is rigidly secured relative to the housing adjacent one end of the horizontally extending axis 168. A rotatable shaft 174 extends from one side of the housing to the other along the horizontal axis 168. The shaft 174 has an end portion 174a which projects outwardly from the mounting plate 172 and is adapted to be rotatable within one of the journals 136 of the platform 132, as shown in FIG. 5 of the drawings. The other end of the shaft 174 is rotatably mounted in the other journal 136 and projects beyond the edge of the platform 132. A pulley 176 is secured to the shaft 174. In use, the pulley 176 is rotatably driven by the pulley 130 which is, in turn, driven by the drive motor 112. The horizontal drive shaft 174 is connected by gear means to the vertical drive shaft 164. As shown in FIG. 3 of the drawings, the drive shaft 164 has a flange 180 and a pin 182 at the lower end thereof. Flange 180 has four threaded passages 184 formed therein. The circular cutter blade 166 has a central opening 186 which is adapted to receive the pin 182. The cutter blade 166 also has four openings 184a formed therein. A plate 188 has a central opening 190 formed therein adapted to receive the pin 182 at a close fitting sliding relationship. The plate 188 also has openings 184b formed therein which are adapted to be faced in axial alignment with the openings 184 and 814a formed in the flange 180 and blade 166, respectively. Clamping screws 192 are adapted to extend through the openings 184b and 184a to threadably engage within the openings 184 and the flange 180 to clamp the blade 166 adjacent the lower end of the shaft 164. It is an important feature of this invention that the circular cutter blade is mounted adjacent to the end of the shaft 164 rather than spaced at a substantial distance therefrom. By locating the cutter blade at the end of the shaft, it is possible to lower the cutter blade very close to the surface of the road when the apparatus is in use.

The safety guard 162 has a pair of anchor pins 194 which are adapted to fit within openings formed in the sleeves 196 which are secured to the housing 160. The manner in which one of the pins 194 engages in the opening formed in the sleeve 196 is shown by the chain line 198. The guard 162 has a blade protection segment 200 which extends over a substantial portion of the blade, as shown in FIGS. 4 and 5. The guard 200 has an H-shaped cooling fluid conduit 204 having one leg connected to the cooling fluid inlet conduit 202, the two outlet legs being connected to the guard frame to an opening therethrough to discharge cooling fluid at spaced intervals onto the upper surface of the cutter blade.

The cutter blade is preferably a diamond segmented blade such as that widely used for the sawing on concrete asphalt or stone or the like.

Anchor pin 206 is pivotally mounted at its inner end to compare finders 208 which are mounted on the housing 160. The anchor pin 26 has a threaded outer end adapted to receive a pair of lug nuts 210 which, in use, are mounted one on either side of the lugs 142, is extended downwardly from the platform 132. The anchor pin 162 is used to lock the housing 160 relative to the platform 132 in a position with the axis 170 extending vertically downwardly from the carriage 40. When the housing is obliquely disposed relative to the carriage, as shown in FIG. 5, the anchor pin 205 is released.

From the foregoing description of the apparatus, it will be seen that the cutter blade 166 is rotatably driven by means of the motor 122 by way of a suitable drive mechanism while the carriage 40 is driven along the longitudinal guide track by means of the friction wheel 122 which is also driven by the motor 112. The movement of the carriage is maintained in a straight line by the upwardly protected flange portion 76 of the guide rails 68 which engages the slots 148 formed in the guide members 146 which are secured to the carriage 40. The longitudinal guide mechanism ensures that the cutter blade will be removed in a straight longitudinal path relative to the frame. Transverse movement of the cutter blade relative to the frame is achieved by releasing the clamping screws 94 and rotating the crank handles 106 to drive the rack 84 which is secured at each end of the guide rails 67 and 68. The support wheels 96 roll along the V-shaped guide rails 100 to facilitate the transverse movement of the longitudinal guide assembly.

The method of operation of the apparatus will be more clearly understood with reference to FIGS. 4 and 5 of the drawing. As previously indicated, the apparatus is primarily intended for use in cutting curbstones, such as that illustrated at 220 in FIGS. 4 and 5. Prior to the cutting of the curbstone, the fill which is normally located at the outer face of the curbstone is removed. The frame is then maneuvered into position with the longitudinal guide rails disposed in a substantially parallel relationship with respect to the longitudinal extent of the curbstone. The jacking screws 36 which are located at each corner of the frame are then adjusted to support the frame. The wheel mountings are released to that the wheels 44 do not support the weight of the frame. As shown in FIG. 5 of the drawings, the wheels are pivoted rearwardly and simply rest upon the surface on which the frame is mounted. The frame is supported by the jacking screws 36 with the transverse frame members 24 disposed in a substantially horizontal plane. The carriage 40 is located adjacent the freer end of the frame. The clutch lever arm 124 is moved to the position wherein the drive wheel 122 is disengaged and the motor 112 is started. The motor 112 drives the cutter blade 116, as previously described. Cooling fluid is fed to the cutter blade by way of the conduit 202 from a suitable source (not shown) and the transverse crank arms 106 are rotated in the direction of the arrow A shown in FIG. 4. Rotation of the crank arm in this direction moves the longitudinal guide rail assembly in the direction of the arrow B while the cutter blade 166 is rotatably driven. It will be understood that when a longitudinal cut is to be made, the housing 160 is mounted with the axis 170 disposed in a vertical plane and not in the obliquely disposed plane shown in FIG. 5. The blade 166 cuts into the curbstone 220 to a predetermined depth by cranking the crank handles 106. The depth of the cut may be the full width of the curbstone or a fraction thereof, as required. When the cutter has reached the required depth, the clamping screws 94 are tightened to rigidly secure the longitudinal guide rail assembly relative to the frame. As previously indicated, the carriage 40 and blade 166 are moved longitudinally relative to the frame by means of the friction drive wheel 122. To achieve this forward movement of the carriage on the guide rail assembly, the clutch lever 124 is moved to the engaging position so that the drive wheel 122 is driven by the motor 112. The rate of forward movement of the cutter blade on the housing will be limited by the rate at which the cutter blade 166 cuts through the curbstone. The rate of forward movement is less than that which would be created if the carriage were moved forward at the speed of the drive wheel 122 with the result that the drive wheel 122 skids on the bearing surface 72. The forward driving force transmitted to the carriage 40 by the drive wheel 122 is sufficient to maintain a substantially constant load on the cutter blade 166. If the length of cut which is required is greater than the length of forward movement permitted by the longitudinal guide means, the frame assembly is moved forward and relocated relative to the curbstone. This can be achieved really simply by relocating the support wheels 44 in the operative position and rolling the frame forward on the wheels 44. If more than one pass is required to cut through the full width of the curbstone, the clutch lever 124 is moved to the disengaging position and the carriage 40 is moved back to the rear of the longitudinal guide rail assembly. The clamping screws 94 are released and the longitudinal guide rail assembly is moved transversely of the frame by the crank arms 106, as previously described, while the cutter blade continues to rotate to form a deeper cut into the curbstone. When the required depth of cut is reached, the clamping screws 94 are again tightened down and the clutch lever 124 moved to the operative position to engage the drive wheel 122 to drive the carriage 40 forward, as previously described.

Conventional drive-in access ramps have obliquely disposed sides and, to achieve this similar appearance, the housing 160 is pivoted to the obliquely disposed position shown in FIG. 5 of the drawings. To achieve this position, the anchor pin 206 is released from the lugs 142 and the adjustment plate 172 is rotated relative to the plate 140 carried by the carriage. The plate 172 is rigidly secured to the plate 140 in the obliquely disposed position by means of the clamping screw 173 which is shown in FIG. 5 of the drawings. When the drive shaft 164 is disposed in this oblique position, the cutter blade 166 is longitudinally obliquely disposed relative to the horizontal plane so as to cut obliquely through the curbstone 220. When the cutter blade is in the obliquely disposed position, it is important to ensure that no forward movement of the carriage occurs while cutting is taking place and this is ensured by moving the clutch lever 124 to the disengaged position. The oblique cut is achieved by moving the rotating cutter blade 166 transversely of the frame by rotating the crank arms 106 in the direction of the arrow A. When an oblique cut has been made at both ends of the longitudinal cut 224, a complete portion of the curbstone may be removed.

To complete the operation of forming a drive-in ramp, the exposed cut surface of the concrete may by coated with a suitable coating to provide a protection against the elements. The coating may be in the form of a thin layer of cement or any other suitable material which will prevent penetration of the body of the concrete by water or the like. In practice, it has been found that, by using a diamond coated cutter blade, the finish which is formed on the cut surface is not readably penetrated by water as the fine particles which are the product of the cutting operation tend to fill the porous structure of the concrete with the result that, in many instances, it is not necessary to apply an additional protective coating. After the cut has been made, the remaining portion of the drive entrance may be completed by re-filling the portion of the driveway adjacent to the cut curbstone.

It will be apparent from the foregoing description of the present invention that the method and apparatus provides for the cutting of curbstones and the like in a very efficient manner. With this apparatus, the operation may be carried out swiftly with one or two operators and, after the cut has been made, the drive access may be available for immediate use. There is a substantial saving in material costs due to the fact that the curbstone itself is not completely destroyed. Similarly, there is a substantial saving in the man hours due to the fact that it is not necessary to break up the curbstone by means of air hammers nor is it necessary to construct the former and to pour concrete to form a new curbstone. The use of a diamond coated cutter blade provides a surface finish which is, in many instances, quite satisfactory without requiring any additional protective coating.

After one operation has been completed, the wheels may be located in their operative position and the jacking screws 42 raised to provide clearance. The frame may then be hitched up to a motor vehicle in the conventional manner and transported to a new site.

What I claim as my invention is:

1. A device for cutting curbstones and the like comprising:
    a. a support frame in the form of a road going mobile trailer having road engaging wheel means mounted thereon and jacking means for supporting said frame in a stationary position with said road engaging wheels out of supporting engagement with the road surface,
    b. a pair of transverse guide rails located at either end of said frame and extending transversely thereof,
    c. a longitudinal guide rail assembly consisting of a pair of guide rails extending longitudinally of said frame in a fixed spaced parallel relationship and mounted at either end thereof on said transverse guide rails for transverse movement relative to said frame,
    d. transverse drive means for moving said guide rail assembly transversely of said frame on said transverse guide rails,
    e. carriage means mounted for longitudinal movement on said longitudinal guide rails,
    f. a rotary cutter assembly including,
    g. a drive shaft extending downwardly from said carriage and a rotary cutter blade mounted on the lower end of said drive shaft for rotation therewith in a substantially horizontal plane, h. drive means mounted on said carriage for movement with said carriage relative to said frame, i. first transmission means connecting said drive means in said drive shaft to rotatably drive said cutter blades, j. second transmission means connecting said carriage and said drive means to drive said carriage longitudinally of said frame while simultaneously rotatably driving said cutter blade to form a longitudinal cut in a curbstone or the like, and k. clutch means for disengaging said second transmission means as required in use.

2. A curbstone cutting device as claimed in claim 1, including an internal combustion engine mounted on said carriage, said engine providing the drive means for driving said carriage longitudinally of said guide rails and the drive means for rotatably driving said cutter blade.

3. A device for cutting curbstones and the like comprising:

a. a support frame in the form of a road going mobile trailer having road engaging wheel means mounted thereon and jacking means for supporting said frame in a stationary position with said road engaging wheels out of supporting engagement with the road surface, b. a carriage mounted on said frame for controlled longitudinal and controlled transverse movement relative to said frame, c. cutter blade means mounted for rotation on said carriage and movable relative to said carriage between a position in which the cutter blade is disposed in a horizontal cutting plane for movement in a direction parallel to the longitudinal direction of travel of the carriage and a position wherein the cutter blade is disposed in a plane angularly inclined relative to said horizontal plane and parallel to the transverse plane of travel of said carriage relative to said frame, d. first drive means for moving said carriage longitudinally of said frame, e. second drive means for moving said carriage transversely of said frame, and f. means on said carriage for rotatably driving said blade.

4. A curb cutting device as claimed in claim 3, wherein said drive shaft housing is adapted to be locked in any one of a plurality of inclined positions between said vertical lowered position and said elevated horizontal position to dispose the cutter blade at any one of a number of angles relative to the horizontal plane as required in use.

5. A curb cutting device as claimed in claim 3, wherein said cutter blade is in the form of a diamond coated rock cutting circular blade.

6. A device for cutting curbstones and the like comprising:

a support frame consisting of a pair of longitudinally extending main frame members and a pair of transversely extending main frame members located one at either end of said longitudinal members to form a rectangular main frame;

trailer hitch means at one end of said main frame;

adjustable main frame jacking means at each corner of said rectangular frame for supporting said main frame in a stationary operative position;

wheel means adjustably mounted on said frame to be movable between a first lowered position wherein said wheels support said frame and a second elevated position wherein said wheels are disposed above the lower end of a said frame jacking means;

transverse guide rail means secured to each end of said frame and extending parallel to said transversely extending frame members;

longitudinal guide track means extending between said transverse guide rail means and mounted for transverse movement thereon, said longitudinal guide track means consisting of a pair of longitudinally extending spaced parallel guide rails;

transverse support wheel means mounted for rotation at each end of said longitudinal guide rail means, said transverse wheel means being rotatably mounted on said transverse guide track means such that longitudinal track means may be moved transversely of said frame;

rack drive means secured at each end of said longitudinal guide track means and extending parallel to said track means and extending parallel to said transversely extending frame members;

pinion drive means having a support shaft rotatably mounted in each of said transversely extending frame members and a pinion gear engaging said rack, said pinion gears being rotatable to drive said rack and attached longitudinal guide track transversely of said frame; releasable locking means for locking said longitudinal guide means in a set transverse position relative to said frame;

a carriage mounted on said longitudinal guide track means for longitudinal movement thereon in a controlled longitudinal path, drive motor means mounted on said carriage;

longitudinal drive means for driving said carriage longitudinally along said longitudinal track;

clutch means in said longitudinal drive means for engaging and disengaging said longitudinal drive means with said drive motor as required.

a drive shaft housing pivotably mounted on said carriage for movement about a transverse axis;

a main drive shaft journaled in said housing for rotation about a primary axis which extends at right angles to said transverse axis;

primary drive means connecting said drive shaft and said drive motor means for rotatably driving said shaft;

said drive shaft housing being pivotable from a first position wherein said primary drive shaft extends vertically downwardly to an elevated position wherein said shaft is substantially horizontal;

said drive shaft being securable in a plurality of intermediate pivoted locations between said vertical and horizontal positions;

said drive shaft having a free end projecting from the outer end of said housing;

a circular cutter blade rigidly secured at the free end of said drive shaft for rotation therewith;

said cutter blade being transversely movable to effect a transverse cut by moving said longitudinally extending guide means transversely of said frame and longitudinal movable to effect a longitudinal cut by moving said carriage longitudinally on said longitudinal guide means;

said cutter blade being adjustable between a horizontal cutting plane and a longitudinally obliquely disposed cutting plane by pivotably adjusting said drive shaft housing relative to said carriage.

* * * * *